United States Patent
Kawakatsu

Patent Number: 6,105,425
Date of Patent: Aug. 22, 2000

[54] VIBRATION TYPE LEVEL DETECTOR

[75] Inventor: Hiroshi Kawakatsu, Ibaraki, Japan

[73] Assignee: Nohken Inc., Osaka, Japan

[21] Appl. No.: 09/250,171

[22] Filed: Feb. 16, 1999

[30] Foreign Application Priority Data

Apr. 6, 1998 [JP] Japan ................... 10-093169
Aug. 11, 1998 [JP] Japan ................... 10-226875

[51] Int. Cl.$^7$ .................................... G01F 23/28
[52] U.S. Cl. ............................................ 73/290 V
[58] Field of Search ...................... 73/290 V, 1.82, 73/DIG. 1, DIG. 2, DIG. 5, 866.5, 668, 649, 651, 652, 662, 432.1

[56] References Cited

U.S. PATENT DOCUMENTS

| | | | |
|---|---|---|---|
| 3,266,311 | 8/1966 | Andreasen et al. | 73/290 V |
| 4,558,588 | 12/1985 | Beaudoin et al. . | |
| 4,740,726 | 4/1988 | Umezawa | 310/316 |
| 4,785,663 | 11/1988 | Hermann | 73/290 V |
| 4,839,590 | 6/1989 | Koski et al. | 324/208 |
| 5,247,832 | 9/1993 | Umezawa et al. | 73/290 V |
| 5,670,709 | 9/1997 | Gallagher . | |

FOREIGN PATENT DOCUMENTS

| | | |
|---|---|---|
| 0 123 608 A1 | 10/1984 | European Pat. Off. . |
| 0 499 265 A2 | 8/1992 | European Pat. Off. . |
| 4-259823 | 9/1992 | Japan . |
| 5-10804 | 1/1993 | Japan . |
| 6-102079 | 4/1994 | Japan . |

*Primary Examiner*—Hezron Williams
*Assistant Examiner*—Rose M. Miller

[57] ABSTRACT

A base of a detection pipe is fixed. A vibration piece has its one end fixed to a closing portion and the other end provided with a permanent magnet. An electromagnet is closely attached inside the detection pipe such that it is arranged in a direction of axis of the permanent magnet, thereby forming a folded cantilever. Vibration is detected by a distortion detecting element, and the output therefrom is amplified by an amplification circuit for driving the electromagnet. Thus, the detection pipe, closing portion and vibration piece are repeatedly vibrated.

8 Claims, 8 Drawing Sheets

VIBRATION TYPE LEVEL DETECTOR

BACKGROUND OF THE INVENTION

1. Field of the Invention

The present invention relates to vibration type level detectors, and more specifically to a vibration type level detector for detecting a change in the level of a powder and granular material, liquid or the like.

2. Description of the Background Art

In Japanese Patent Laying-Open No.6-102079, a vibration type level detector is described as using a sound piece vibrator. The vibration type level detector includes: a vibration piece of which one end, having its apex portion supported, inserted into a container and having a magnetic substance on a side surface around a leading end of the other end; a vibration generating coil and a reception coil which are arranged to sandwich the magnetic substance on the vibration piece with an appropriate distance therebetween; an amplification portion amplifying a signal from the reception coil and then applying it to the vibration generating coil; and an output portion outputting an output signal in accordance with a reception signal generated in the reception coil.

In the vibration type level detector having the above mentioned structure, when amplification degree in the amplification circuit is increased, the magnetic substance slightly moves at a certain point, and a voltage is induced in the reception coil. Then, the voltage is amplified in the amplification circuit and applied to the vibration generating coil. Thereafter, a magnetic field is generated for suction (repulsion) of the magnetic substance. Thus, the magnetic substance is greatly vibrated, and the voltage generating in the reception coil increases. As a result, vibration of the vibration piece is continued at a constant value. If particles or the like come into contact with the vibration piece inserted into the container while the vibration is continued, the voltage induced in the reception coil decreases as compared with a vibration generating value, and an output signal is output in accordance with the decrease in the voltage.

However, in the vibration type level detector, vibration generated at an electromagnet must efficiently be transferred to the portion of the vibration piece which is in contact with the particles. Therefore, inside portion of a tank is separated from the outside portion, and the vibration piece is supported by a flexible member such as a thin film plate of silicon rubber, for example, so that the vibration of the vibration piece would not be constrained.

In the above described vibration type level detector, as the vibration generating coil and the reception coil are arranged close to each other, the magnetic field generated by the vibration generating coil becomes a large electromotive force when it reaches the reception coil. Thus, it is difficult to detect a slight change in the electromotive force between the magnetic substance and the reception coil due to a slight decrease in the vibrator which depends on the existence or non-existence of the particle, and the particles which are low in relative density cannot be measured.

In addition, the vibration generating coil and the reception coil are arranged to sandwich a diaphragm in a direction which allows the direction of the magnetic field to be orthogonal to the longitudinal direction of the diaphragm, with an appropriate space from the magnetic substance on the side surface of the diaphragm. As a result, a relatively large space is required, so that the compact vibration type level detector cannot be achieved. Further, in mounting the vibration piece to the tank, a sufficient mechanical strength is not obtained as the vibration piece must be supported by the thin film plate so that vibration thereof would not be constrained.

On the other hand, another conventional method is to mount a piezoelectric device which mainly includes titanate lead zirconate ($PbTiO_3$-$PbZrO_3$) to a part of the diaphragm as a vibration generating means, apply a high voltage from an amplification circuit to the piezoelectric device, transfer mechanical distortion generated from the piezoelectric device to the diaphragm, and generate vibration necessary for the measurement.

However, a driving voltage applied to the piezoelectric device and a intensity of the generated vibration (amplitude by vibration) are in a direct proportion. Thus, the voltage is high as compared with a usual circuit voltage and is generally between several tens of volts to several hundreds of volts. Thus, another circuit for internally generating a voltage is required.

Further, a breakdown voltage or insulation performance of the portion to which the high voltage is applied must carefully be considered, and there is a danger of an electric shock if a person inattentively touches it. Besides the fact that the applied voltage is high, the piezoelectric device itself generates a high voltage by impact or vibration. As a result, atmospheric discharge may be caused by the high voltage, and the use of the detector in inflammable gas or inflammable vapor is highly restricted.

In addition, a ferroelectric substance such as titanate lead zirconate, which is used as a material for the piezoelectric device, has a crystalline structure called a perovskite form, which has a pyramidal quadratic system at a room temperature, and a piezoelectric effect is obtained by spontaneous polarization. However, it loses the spontaneous polarization as the structure thereof changes to a cubic system due to increase in temperature, whereby the piezoelectric effect can no longer be obtained. The temperature at which the phase of the crystalline structure changes from the pyramidal quadratic system to the cubic system is called a Curie point. The piezoelectric effect gradually decreases as the temperature rises from the room temperature toward the Curie point, at which point no piezoelectric effect is obtained. Thus, when the piezoelectric device is used as a vibration generating means, it is impossible to use it at the temperature above the Curie point, and even below the Curie point, any change in the temperature results in a change in a vibration generating efficiency and, strictly speaking, results in a variation in detection sensitivity.

SUMMARY OF THE INVENTION

It is therefore a main object of the present invention to provide a vibration type level detector which is not restricted by an environment in which it is used, and provided with high mechanical strength and low driving voltage.

Briefly speaking, the present invention is a vibration type level detector including: a detection pipe having a base as a fixed end and a leading end as a free end which is closed with a closing portion; a vibration piece arranged inside the detection pipe; and an electromagnet arranged to face a magnet which is positioned at the leading end of the vibration piece. The vibration piece is excited by the electromagnet and the magnet for repeatedly vibrating the detection pipe, closing portion and vibration piece, and the repeated vibration is detected by the detector.

Therefore, according to the present invention, a piezoelectric device needs not be used as a vibration generator or detector. In addition, the detector is safe and provided with high explosion proof, and can be fixed to a container or the like using the base of the detection pipe as the fixed end. Moreover, a vibration mode of the repeated vibration is not affected by a structure, material or mass of a container or the like and a method of attaching the same, so that adjustment for attachment is not necessary.

In a preferred embodiment of the present invention, a permanent magnet or an electromagnet is mounted to the vibration piece.

More preferably, an inner surface of the detection pipe on the side of the fixed end is threaded, into which a hollow internal rod having the electromagnet at its one end is screwed therein.

More preferably, a distortion detecting device or an acceleration sensor is provided as a detector on the side of the closing portion of the detection pipe.

According to another aspect of the present invention, an electromagnet is arranged to face a magnetic substance which is provided at a leading end of a vibration piece inside a detection pipe, so that the detection pipe, closing portion and the vibration piece are repeatedly vibrated by the electromagnet and the magnetic substance.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figures 1A, 1B, 1C:
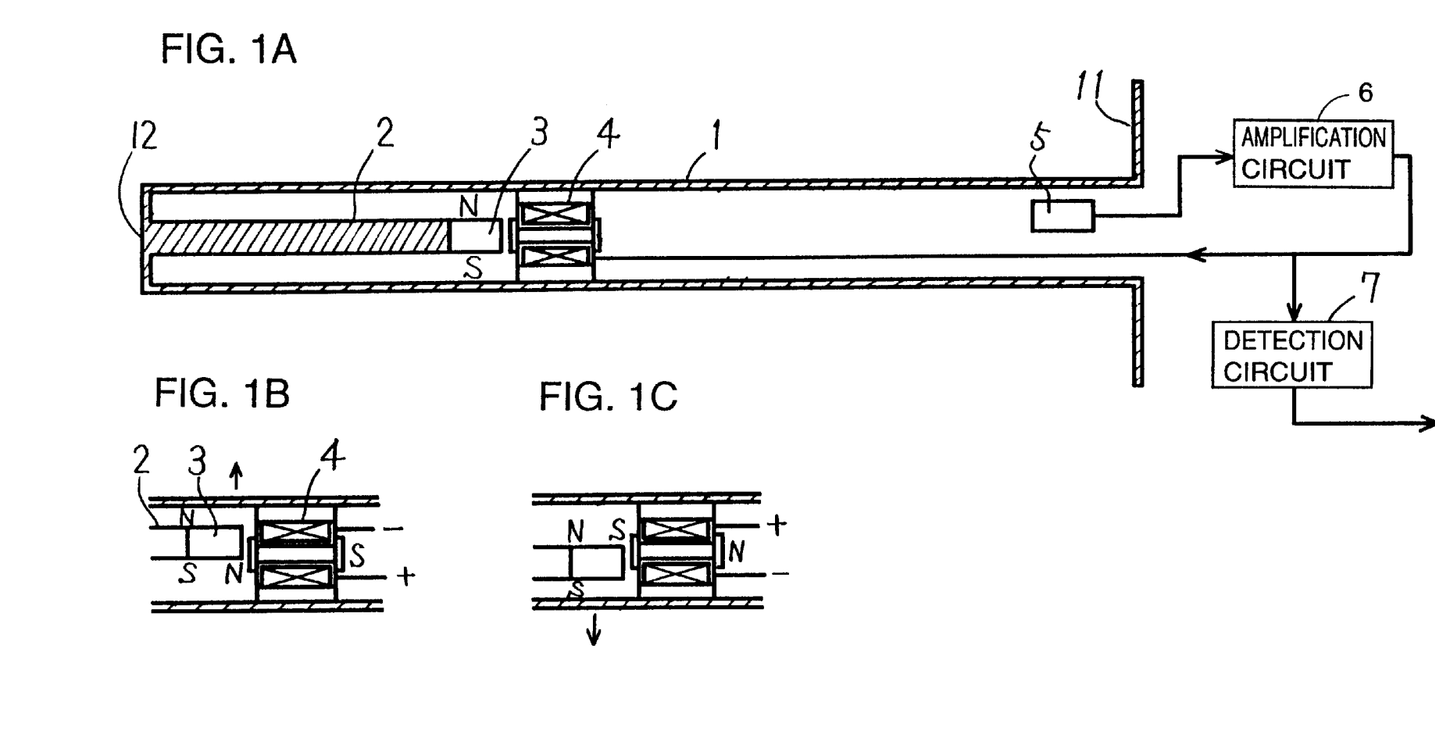
FIGS. 1A to 1C are block diagrams showing cross sections and a control system of a vibration type level detector according to one embodiment of the present invention.

FIGS. 1A to 1C are block diagrams showing cross sections of a vibration type level detector and an electrical system according to one embodiment of the present invention.

In FIG. 1A, a detection pipe 1 has a base 11 as a fixed end and a leading end of a free end which is closed with a closing portion 12, thereby forming a folded cantilever. A vibration piece 2 in an elongate rectangular shape is provided inside detection pipe 1. In other words, one end of vibration piece 2 is fixed to closing portion 12 of detection pipe 1, whereas the other end is provided with a permanent magnet 3 and made free.

Further, an electromagnet 4 is mounted in close contact with the inner wall of detection pipe 1 such that it is arranged in the same direction as an axis of vibration piece 2. When electromagnet 4 is driven by an alternating current, the folded cantilever is vibrated by vibration piece 2, closing portion 12 and detection pipe 1 using base 11 as a fixed end, by a suction and repulsion action of a magnetic field of electromagnet 4 and that of permanent magnet 3.

A distortion detecting device 5 is provided on the inner wall of detection pipe 1 on the side of base 11. Distortion detecting device 5 detects a state of an amplitude by vibration on the side of base 11 of detection pipe 1, converts it to an electrical signal, and applies it to an amplification circuit 6. Amplification circuit 6 amplifies an input signal and again inputs it to electromagnet 4.

Figure 2A:
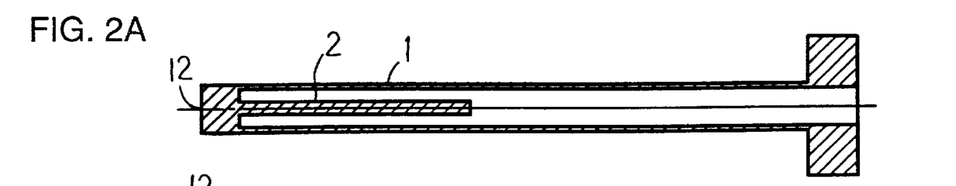
FIGS. 2A to 2H are diagrams shown in conjunction with a vibration mode according to one embodiment of the present invention.
Figure 2B:
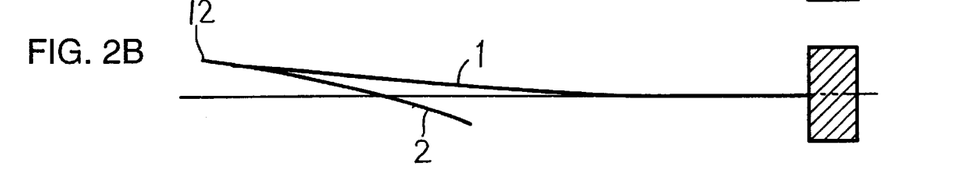
Figure 2C:
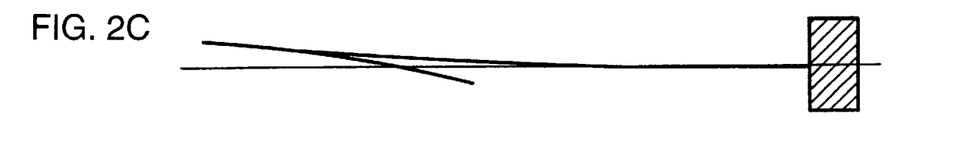
Figure 2D:
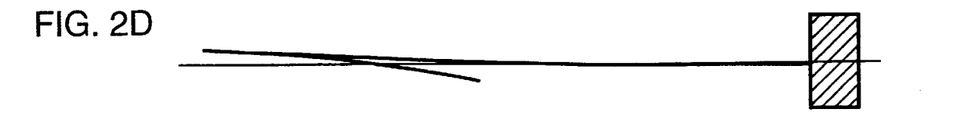
Figure 2E:
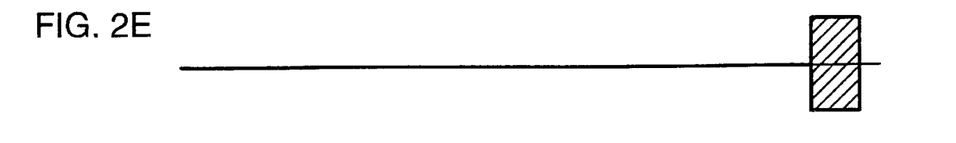
Figure 2F:
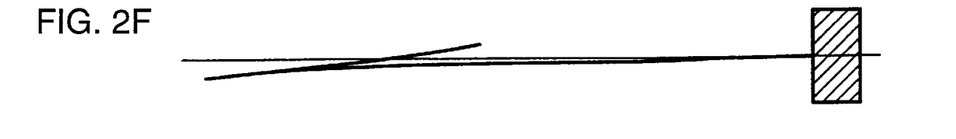
Figure 2G:
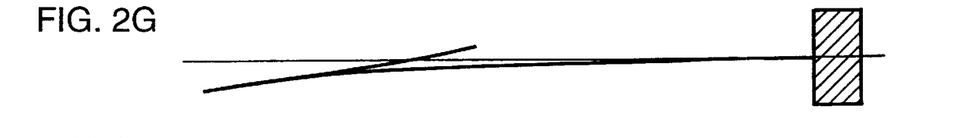
Figure 2H:
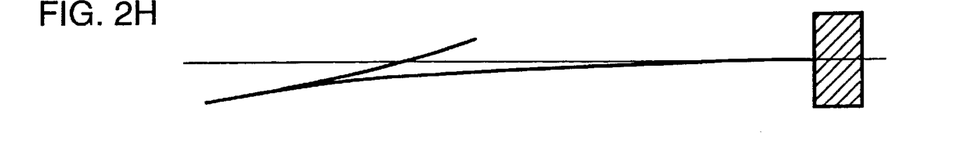

FIGS. 2A to 2H are diagrams shown in conjunction with an operation mode according to one embodiment of the present invention. Referring to FIGS. 2A to 2H, a specific operation of the embodiment of the present invention will be described. Assume that a relation between a polarity of current applied to electromagnet 4 and the magnetic field generated thereby is as shown in FIG. 1B. Then, a pole which faces permanent magnet 3 of electromagnet 4 turns to an N pole, so that a suction force is generated with respect to an S pole of permanent magnet 3 mounted to vibration piece 2, and a repulsion force is generated with respect to the N pole of permanent magnet 3. Thus, the free end of vibration piece 2 moves upwardly in FIG. 1B. A vibration mode of vibration piece 2, closing portion 12 and detection pipe 1 is shown in FIGS. 2A and 2B.

Conversely, if the polarity of the current applied to electromagnet 4 is made opposite, as shown in FIG. 1C, the polarity on the side which is opposite to permanent magnet 3 is made opposite and turns to an S pole, thereby repulsing with respect to the S pole of the permanent magnet of vibration piece 2. Further, a force is downwardly applied to the free end of vibration piece 2 for suction of the N pole. Thus, a vibration mode changes from the state shown in FIG. 2B to the states shown in FIGS. 2C–2H. As a result, by switching the polarity of the current applied to electromagnet 4 in accordance with a vibration frequency which is specific to a vibration system of the folded cantilever, vibration is generated and continued.

In addition, according to the present embodiment, a vibration generating means including permanent magnet 3 and electromagnet 4 nor the piezoelectric element as detection means 5 are not used, the present invention is suited to explosion proof and can increase detection accuracy. Further, as base 11 of detection pipe 1 can be fixed to a container or the like as a fixed end, the vibration mode of the repeated vibration is not affected by a structure, material or mass of the container, nor by a method of attaching the device, and any adjustment would not be required in attaching the device.

Moreover, the device can be arranged in a small space as vibration piece 2 with permanent magnet 3 and electromagnet 4 are arranged in a row in the longitudinal direction inside detection pipe 1. Further, as the vibration mode of the folded cantilever is used, the vibrator needs not be supported by a material, which is flexible such as silicon and is in a form of thin film, so that the vibrator can be firmly fixed to the side wall of the tank. As a result, a sufficient strength and higher resistance to corrosion are ensured.

Figure 3:
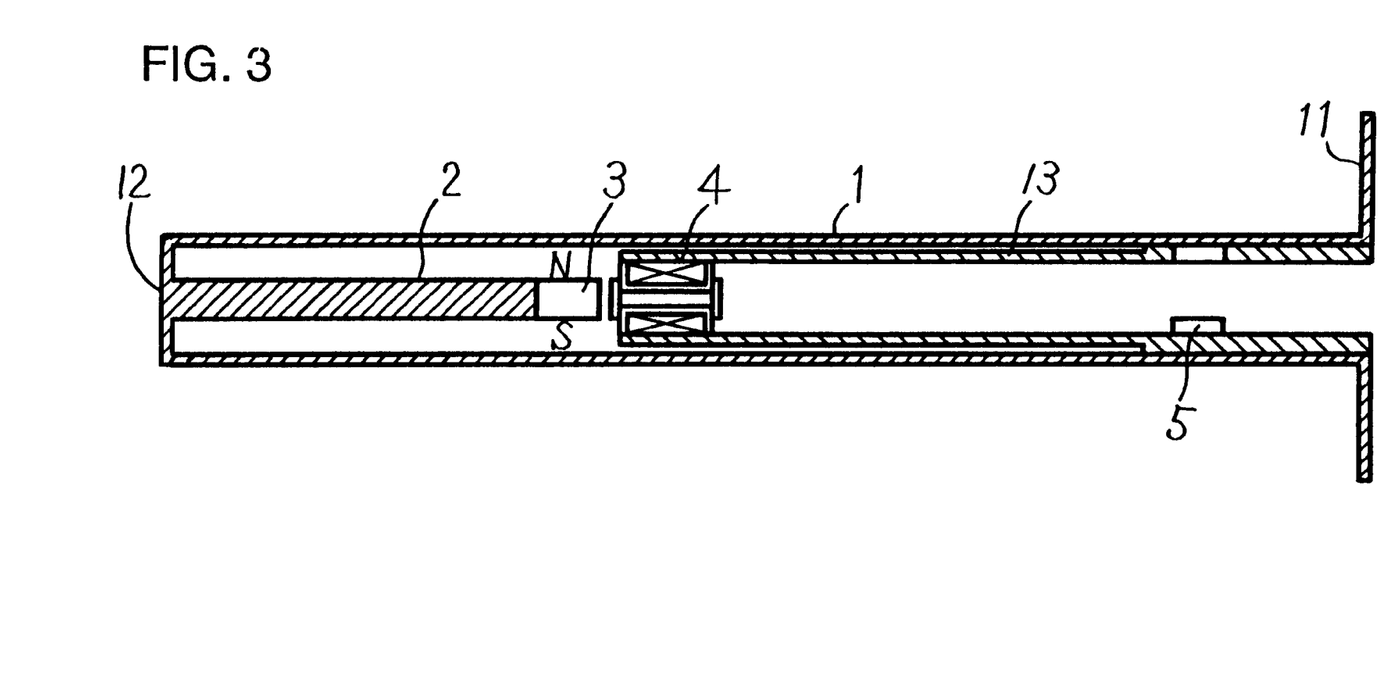
FIG. 3 is a diagram showing another embodiment of the present invention with an electromagnet 4 being retained in an internal rod 13.

FIG. 3 is a diagram showing another embodiment of the present invention. In the aforementioned embodiment shown in FIGS. 1A–1C, electromagnet 4 is closely attached to the inner wall of detection pipe 1. However, such attachment is accompanied by difficulty. Then, in the embodiment shown in FIG. 3, electromagnet 4 is attached to one end of internal rod 13, and the other end of internal rod 13 is fixed to the inner surface on the side of base 11 of detection pipe 1. In other words, electromagnet 4 is attached to the leading end of hollow internal rod 13 such that it is opposite to permanent magnet 3 attached to vibration piece 2. A male screw is formed on the outer periphery surface of the other end of internal rod 13, and a female screw is formed in the inner surface of detection pipe 1, so that internal rod 13 is screwed into detection pipe 1. It is noted that a given clearance is obtained between the outer periphery surface of internal rod 13 and the inner surface of detection pipe 1.

A distortion detecting element 5 is applied to detection pipe 1 on the side which is close to the base. However, distortion detecting element 5 is applied onto the inner surface of internal rod 13 as it is impossible to apply it inside detection pipe 1. As internal rod 13 is screwed into detection pipe 1, distortion due to vibration generated at the base portion of detection pipe 1 is transferred to internal rod 13 and detected.

It is noted that internal rod 13 serves to support electromagnet 4 and transfer the distortion at the base portion of detection pipe 1, but not affect the vibration mode such as a resonance action with the vibration of the diaphragm.

Figures 4A, 4B:
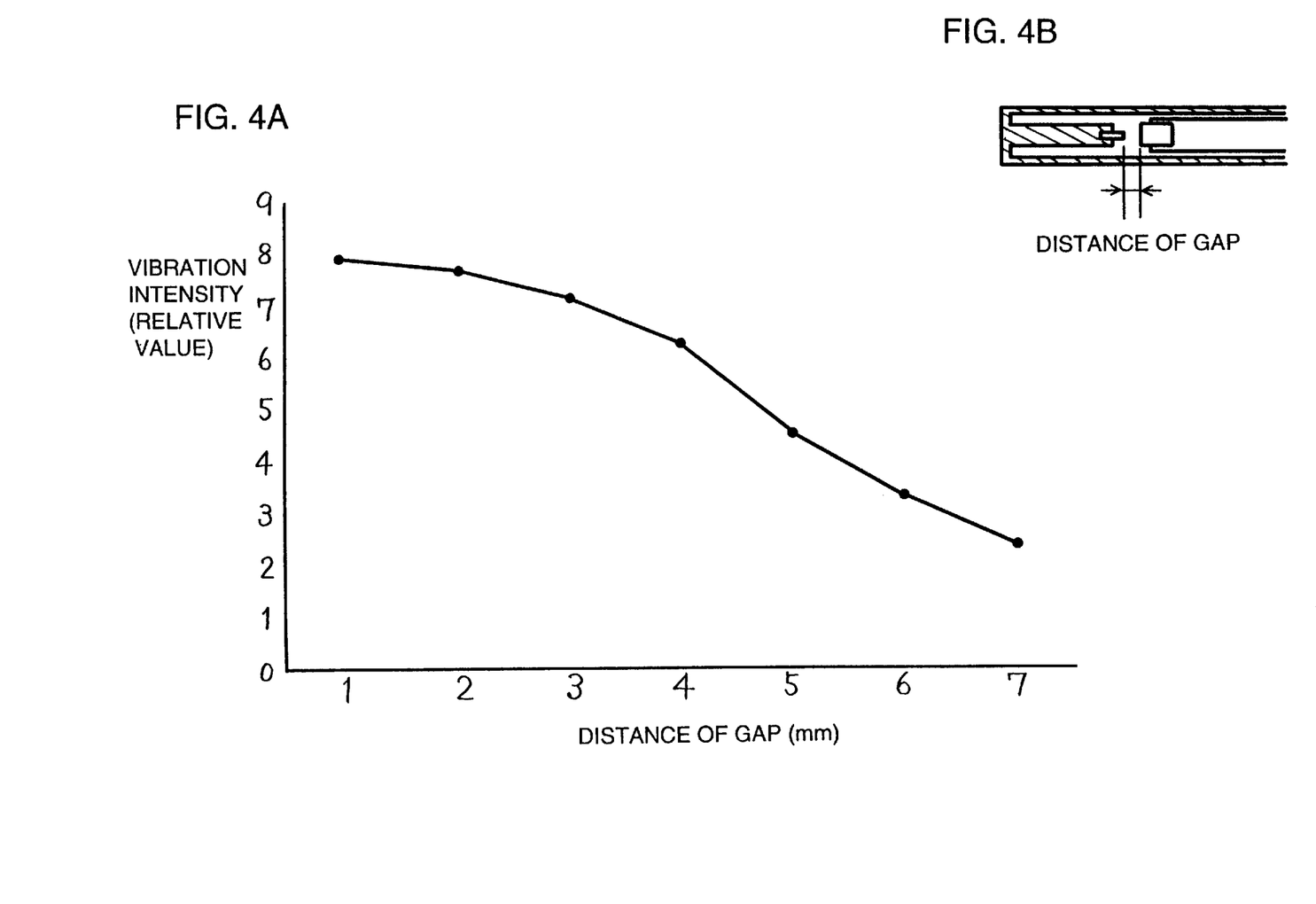
FIGS. 4A and 4B are diagrams showing a relation between a distance of gap and a vibration intensity.

In the present embodiment, the vibration direction of detection pipe 1 and vibration piece 2 is the same as a polarization direction of permanent magnet 3, and distortion detecting element 5 is also adjusted to the direction to ensure the highest sensitivity by screwing internal rod 13 into detection pipe 1. In this case, although a distance of a gap between permanent magnet 3 and electromagnet 4 changes as shown in FIG. 4B, even if the distance of the gap changes between 1 mm and 2 mm, there would only be a slight change in the vibration intensity. Thus, distortion detecting element 5 is preferably adjusted to ensure the highest sensitivity by screwing internal rod 13 into detection pipe 1.

Of course, distortion detecting element 5 may be uniquely adjusted to internal rod 13 to ensure high sensitivity of distortion detecting element 5 with a given distance of the gap therebetween.

Figure 5:
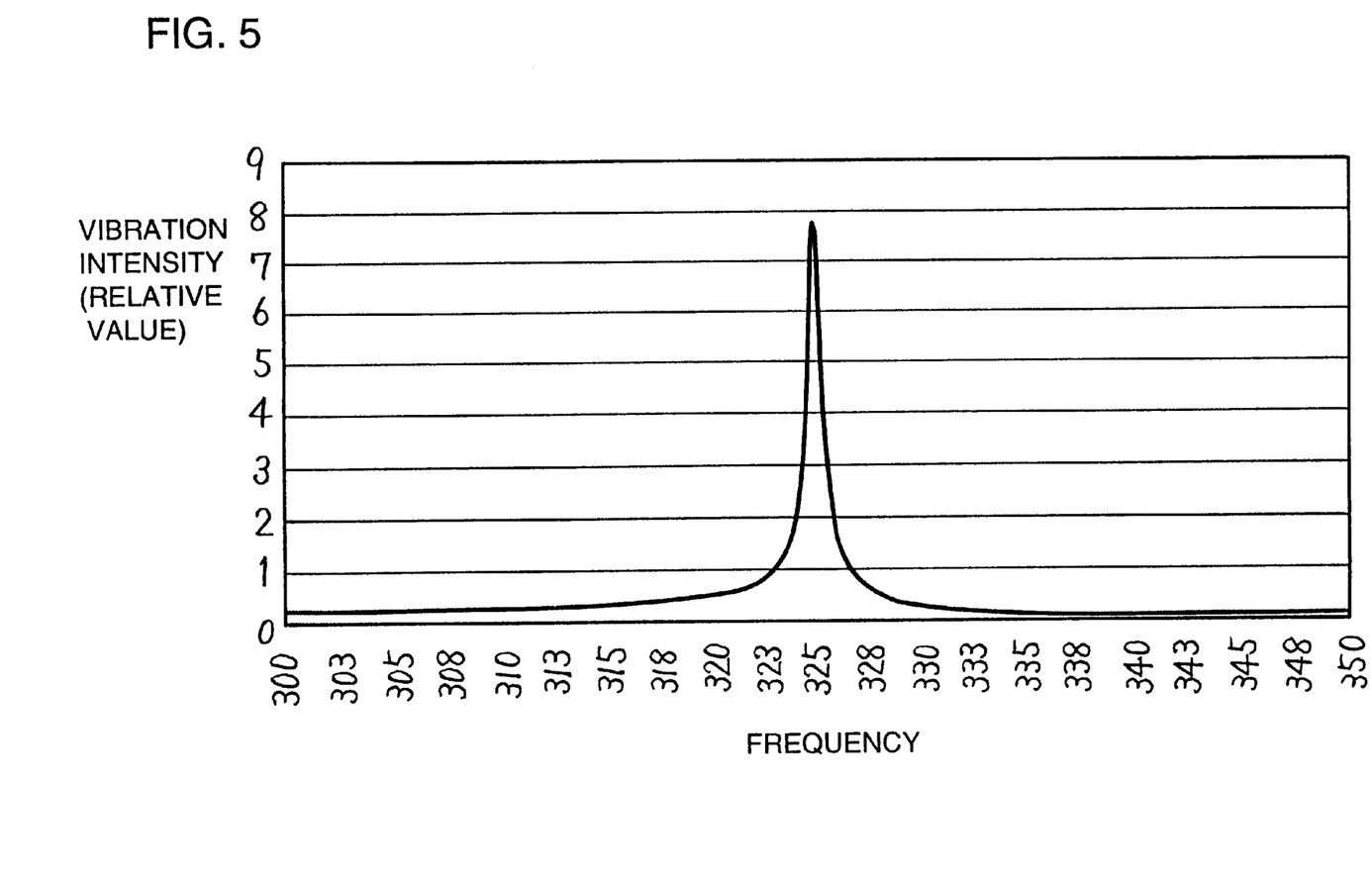
FIG. 5 is a diagram showing a frequency characteristic of the embodiment shown in FIG. 3.

FIG. 5 is a diagram showing a frequency characteristic of the embodiment shown in FIG. 3. As is apparent from FIG. 5, when a frequency of the current applied to electromagnet 4 is 325 Hz, vibration with an extremely high sharpness (Q) is obtained, and it is confirmed that no or very small, if any, vibration would be generated at other frequencies.

Figure 6:
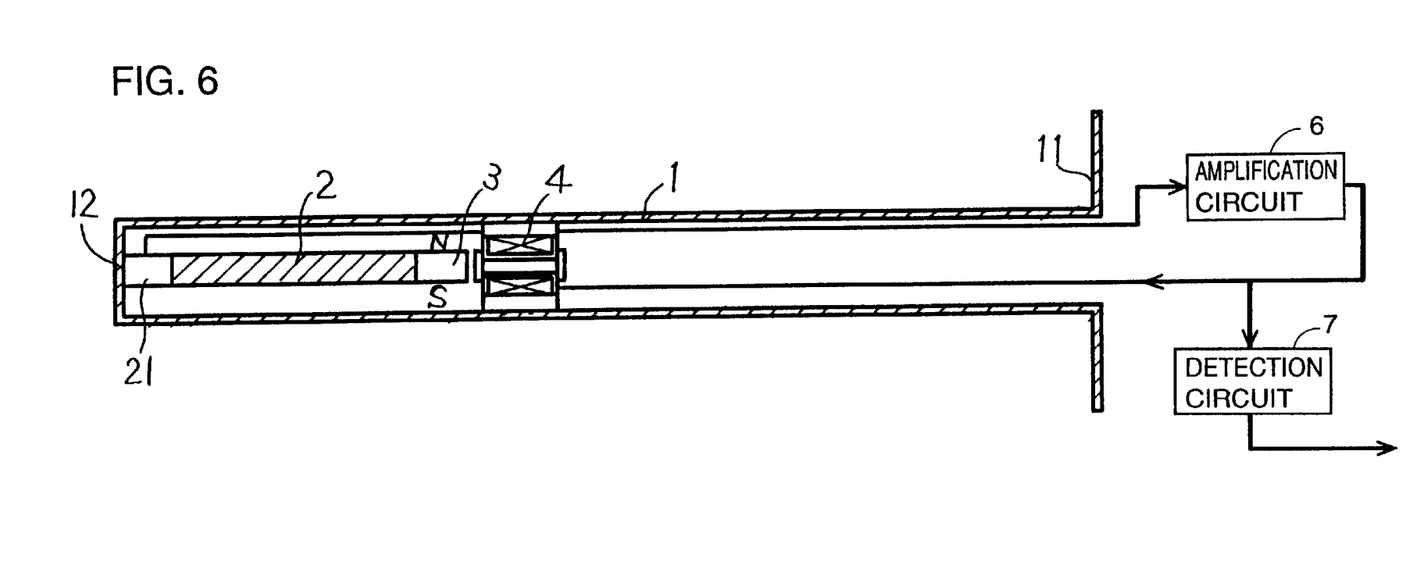
FIG. 6 is a diagram showing another embodiment, with an acceleration sensor 21 provided on the side of a closing portion 12 of a detection pipe 1.

FIG. 6 is a diagram showing still another embodiment of the present invention. In the embodiment shown in FIGS. 1A–1C, distortion detecting element 5 is attached on the side of base 11 of detection pipe 1. However, in the present embodiment, an acceleration sensor 21 for detecting an acceleration of vibration of detection pipe 1 is attached on the inner surface of closing portion 12 of detection pipe 1. Then, the acceleration is detected by acceleration sensor 21, and the detection output is applied to an amplification circuit 6 for amplifying the detected acceleration signal and for applying it to electromagnet 4.

Figures 7A, 7B, 7C:
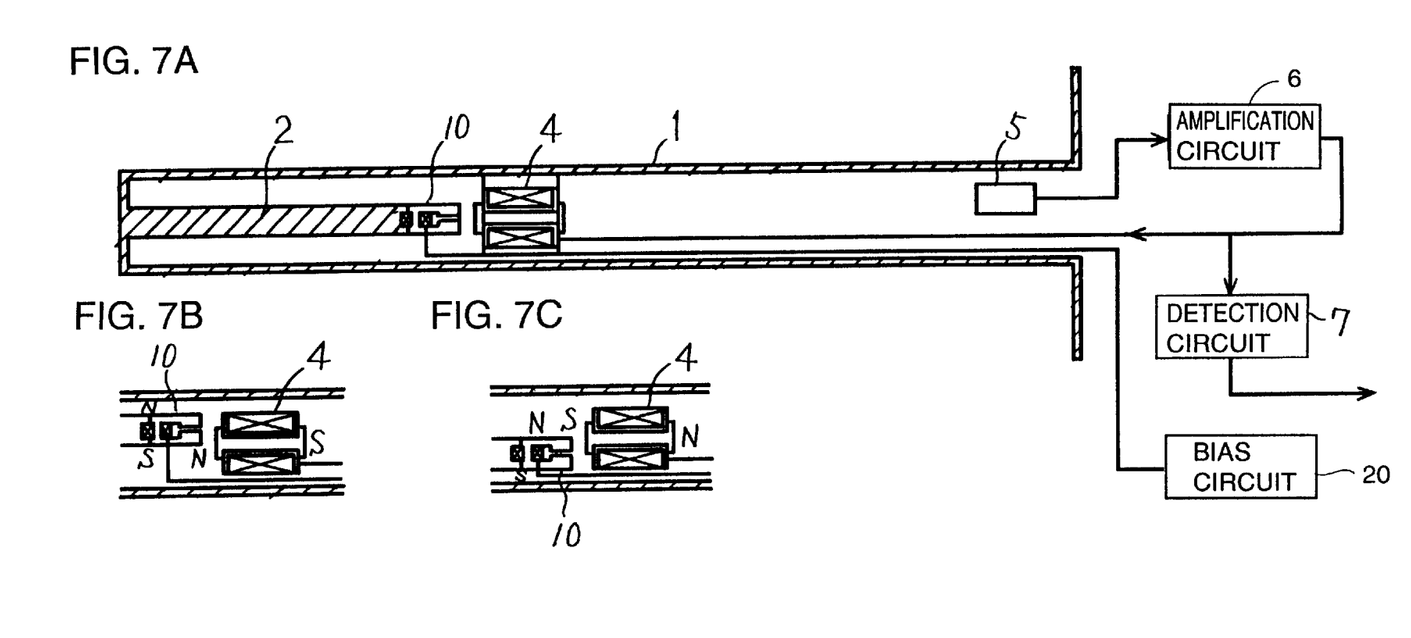
FIGS. 7A to 7C are diagrams shown in conjunction with a bias magnet arranged at a leading end of a vibration piece 2.

FIG. 7A is a diagram showing still another embodiment of the present invention. In the present embodiment, a bias electromagnet 10 is mounted to the leading end of vibration piece 2 in place of permanent magnet 3 shown in FIGS. 1A–1C. A given direct voltage is applied to a bias coil of bias electromagnet 10 from a bias circuit 2, so that N and S poles are respectively generated on the upper and lower sides as shown in FIG. 7B, thereby upwardly moving the free end of vibration piece 2. Then, as in the case of the embodiment described with reference to FIGS. 1A–1C, by switching the polarity of the current applied to the electromagnet 4, S and N poles of electromagnet 4 switches, thereby downwardly moving the free end of vibration piece 2 so that vibration is generated thereby.

Figures 8A, 8B, 8C:
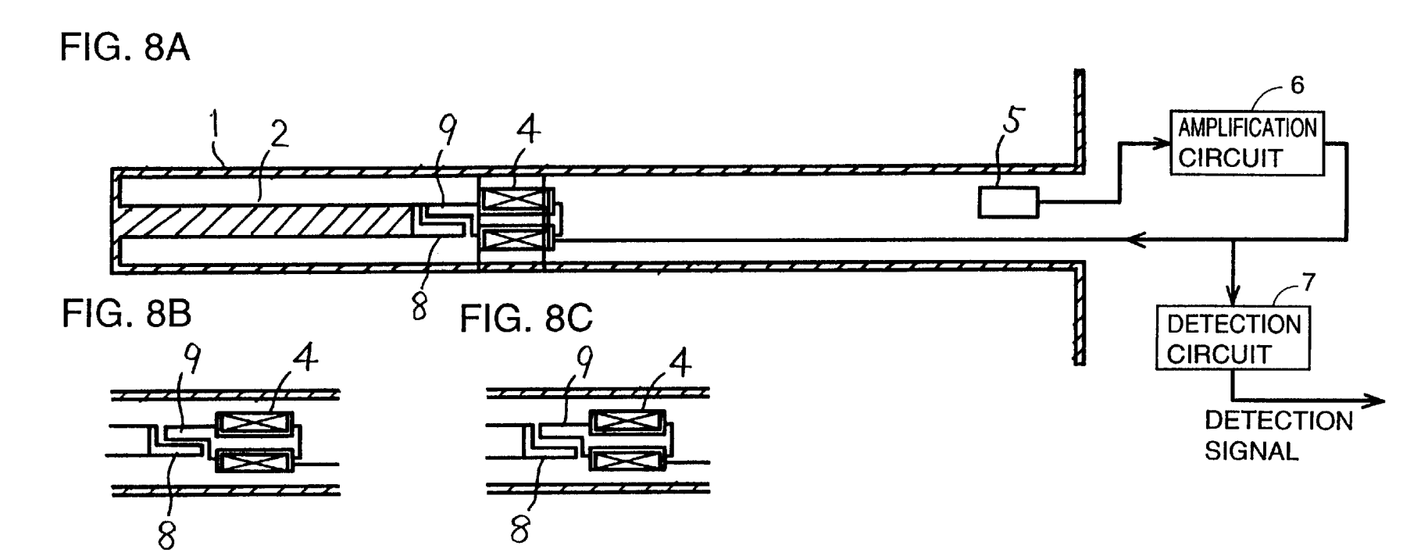
FIGS. 8A to 8C are diagrams showing still another embodiment of the present invention, with a magnetic piece arranged opposite to an electromagnet 4 of a vibration piece 2.

FIGS. 8A to 8C are diagrams showing still another embodiment of the present invention. In the aforementioned embodiment in FIGS. 1A–1C, permanent magnet 3 is mounted to the leading end of vibration piece 2 such that it is opposite to electromagnet 4. However, in the embodiment shown in FIG. 8A, magnetic substances 8 and 9 such as an iron are used in place of permanent magnet 3. In other words, magnetic substance 8 having a cross section generally in an L shape is fixed to the leading end of vibration piece 2 and, similarly, magnetic substance 9 having a cross section generally in the L shape is fixed to electromagnet 4.

When a voltage is applied to electromagnet 4, magnetic substance 8 at the leading end of vibration piece 2 is sucked to magnetic substance 9 which is fixed to electromagnet 4 by a magnetic force generated by electromagnet 4, and therefore, the leading end of vibration piece 2 is moved upward.

In this state, when voltage application to electromagnet 4 is stopped, vibration piece 2 passes the stationary position and moves back to the position shown in FIG. 8C, using its elastic force. Thus, by performing or stopping voltage application to electromagnet 4, mechanical vibration having the same period as that of the voltage application is generated at vibration piece 2, so that detection pipe 1 is vibrated. The vibration is similarly detected by distortion detecting element 5 as in the case of the embodiment shown in FIGS. 1A–1C.

It is noted that, in the above described embodiments, although the signal input to amplification circuit 6 is amplified and again supplied for electromagnet 4 for self-excitation, the present invention is not limited to this and may be applied to a separate excitation system or a follow-up system of a PLL.

As in the forgoing, according to the embodiment of the present invention, the electromagnet is arranged inside the detection pipe such that it is opposite to the electromagnet mounted to the leading end of the vibration piece, permanent magnet or magnetic substance, so that the detection pipe, closing portion and vibration piece are repeatedly vibrated and the vibration is detected by the detection means. As a result, the piezoelectric element needs not be used as a vibration generating means or detection means. Thus, the present invention is provided with explosion proof and can be fixed to the container or the like using the base of the detection pipe as a fixed end. In addition, the vibration mode of the repeated vibration is not affected by the structure, material or mass of the container or the like nor by the attachment method, whereby adjustment is not required at the time of attachment. Further, it can be provided in a small space as the vibration piece, electromagnet, permanent magnet or magnetic piece are arranged in a row inside the detection pipe. Further, by using the vibration mode of the folded cantilever, the vibrator needs not be supported by a material which is flexible and in the form of thin film. Therefore, the present invention can be fixed on the side wall of the tank or the like, so that a sufficient strength and high resistance to corrosion are ensured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vibration level detector, comprising:

a detection pipe having a fixed end with a base and a free end, said free end having a leading end closed by a closing portion;

an elongate vibration piece inside said detection pipe and having one end fixed to said closing portion and another end as a free end, said free end of said vibration piece having a magnet mounted thereto;

vibration generating means including an electromagnet, said electromagnet arranged inside said detection pipe adjacent to the free end of said vibration piece in a same direction as an axis of said vibration piece for exciting said vibration piece and repeatedly vibrating said detection pipe, closing portion and vibration piece; and detection means inside said detection pipe for detecting a vibration state of said repeated vibration.

2. The vibration level detector according to claim 1, wherein said magnet mounted to said vibration piece is a permanent magnet.

3. The vibration level detector according to claim 1, wherein said magnet mounted to said vibration piece is an electromagnet.

4. The vibration level detector according to claim 1, further comprising a hollow internal rod having one end provided with said electromagnet and another end provided with a thread to be screwed into said detection pipe on an outer periphery surface, and wherein a thread is formed on an inner surface of said detection pipe on a side of said fixed end.

5. The vibration level detector according to claim 4, wherein said detection means is mounted on an inner wall of said hollow internal rod.

6. The vibration level detector according to claim 1, wherein said detection means is a distortion detecting element.

7. The vibration level detector according to claim 1, wherein said detection means includes an acceleration sensor mounted on a side of the closing portion of said detection pipe.

8. A vibration level detector, comprising:

a detection pipe having a fixed end with a base and a free end, said free end having a leading end closed by a closing portion;

an elongate vibration piece inside the detection pipe and having one end fixed to said closing portion and another end as a free end, said free end of said vibration piece having magnetic substances mounted thereto;

vibration generating means including a magnet, said magnet arranged inside said detection pipe adjacent to the free end of said vibration piece in a same direction as an axis of said vibration piece for exciting said vibration piece and repeatedly vibrating said detection pipe, closing portion and vibration piece; and detection means inside said detection pipe for detecting a vibration state of said repeated vibration.

* * * * *